United States Patent [19]

Moebius

[11] 4,189,817

[45] Feb. 26, 1980

[54] HYDRAULIC ASSEMBLY TOOL FOR TUBE FITTINGS

[76] Inventor: Kurt O. Moebius, 30544 Oceanaire Dr., Rancho Palos Verdes, Calif. 90274

[21] Appl. No.: 883,226

[22] Filed: Mar. 3, 1978

[51] Int. Cl.$^2$ .............................................. B23P 19/04

[52] U.S. Cl. ....................................... 29/237; 29/252; 29/282

[58] Field of Search ................. 29/237, 235, 252, 234, 29/282; 83/51, 639; 144/193 A, 2 R

[56] References Cited

U.S. PATENT DOCUMENTS

| | | | |
|---|---|---|---|
| 539,573 | 5/1895 | Cartwright | 83/639 |
| 3,280,864 | 4/1966 | Spanenberg | 144/193 A |
| 3,299,496 | 1/1967 | Christensen | 29/237 |
| 3,726,122 | 4/1973 | Dawson | 29/237 |
| 3,727,289 | 4/1973 | Bemelmann et al. | 29/237 |

FOREIGN PATENT DOCUMENTS

| | | | |
|---|---|---|---|
| 28769 | 8/1932 | Netherlands | 83/639 |

*Primary Examiner*—James L. Jones, Jr.
*Attorney, Agent, or Firm*—Lyon & Lyon

[57] ABSTRACT

An assembly tool for tube fittings having a fixed jaw and a coaxially movable jaw which receive a pair of fitting components, the movable jaw being moved axially by a hydraulic drive to and from the fixed jaw, the hydraulic drive being disposed in parallel radially offset relation to the axis of the fitting components; both jaws being so supported as to maintain their coaxial relation when subjected to substantial offset force as applied by the hydraulic drive; both jaws being readily removable for interchange with other assembly jaws of different dimensions, as well as interchange with jaws serving a different purpose, such as shearing jaws. The various elements of the assembly tool are so arranged as to minimize the possibility of injury while manipulating the assembly tool.

9 Claims, 7 Drawing Figures

HYDRAULIC ASSEMBLY TOOL FOR TUBE FITTINGS

BACKGROUND AND SUMMARY

Hydraulically piston and cylinder drives have been used to effect axial interengagement of various devices, usually disposed coaxially with respect to the hydraulic means. The present invention is directed to a tool more suited to the axial interengagement of fittings and is summarized in the following objects:

First, to provide a hydraulic assembly tool wherein a pair of compression jaws are laterally offset from the axis of a hydraulic means; the jaws being so mounted that the jaws are maintained in coaxial relation even though the compression force may be substantial.

Second, to provide an assembly tool for fittings, as indicated in the other objects, wherein, although capable of withstanding high offset force, the jaws are readily removable and interchangeable to receive fittings of different sizes.

Third, to provide an assembly tool for fittings, as indicated in the other objects, which includes a novelly arranged movable jaw with an axially extending offset arm and a track on which the extended end of the arm rides to maintain the jaw in perpendicular relation to its axis of movement.

Fourth, to provide an assembly tool for fittings, as indicated in the other objects, dimensioned to receive a fixed jaw and maintain the fixed jaw in position under high forces exerted when operating the assembly tool.

Fifth, to provide an assembly tool which is particularly adapted for assemblying fittings such as disclosed in U.S. Pat. Nos. 3,827,727; 4,026,006; and 4,061,367.

Sixth, to provide an assembly tool as indicated in the other objects, which includes a novelly arranged piston and shaft extending therefrom, wherein the shaft, when in its retracted position permits removal of the movable jaw, and, when in an intermediate position and extended position, is received in a novel guide bore to resist deviation of the movable jaw from its axially oriented position.

Seventh, to provide an assembly tool, wherein the jaws may be interchanged with jaws intended for other purposes, such as shearing jaws.

DETAILED DESCRIPTION

Figure 1:
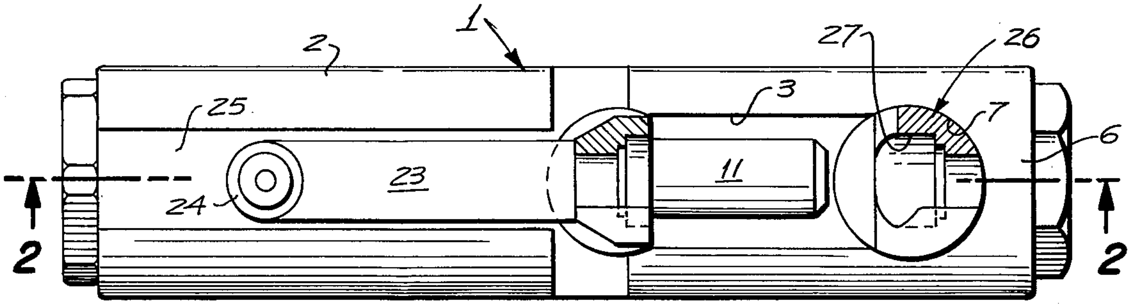
FIG. 1 is a plan view of the hydraulic assembly tool for tube fittings, the fitting receiving jaws partially in section.

The hydraulic assembly tool for tube fittings includes a body structure 1 having at one end a cylinder 2. Beyond the cylinder, the body structure forms a channel portion having side walls 3 and a bottom wall 4. Formed in the bottom wall and adjacent portions of the side wall is a semi-cylindrical bore 5 coaxial with the axis of the cylinder 2. The body structure terminates in a vertical end wall 6 forming a partial bore 7 in excess of a half circle and terminating at its lower end in a full bore penetrating the bottom wall 4.

The cylinder 2 at its end opposite from the horizontal bore 5 is provided with a screwthreaded end closure 8 having a pressure fluid inlet 9. Received in the cylinder 2 is a piston 10 having a guide shaft 11 extending into and centered with respect to the horizontal semi-cylindrical bore 5. The junction between the piston 10 and shaft 11 forms a shoulder which serves as a load bearing surface 12.

Figure 2:
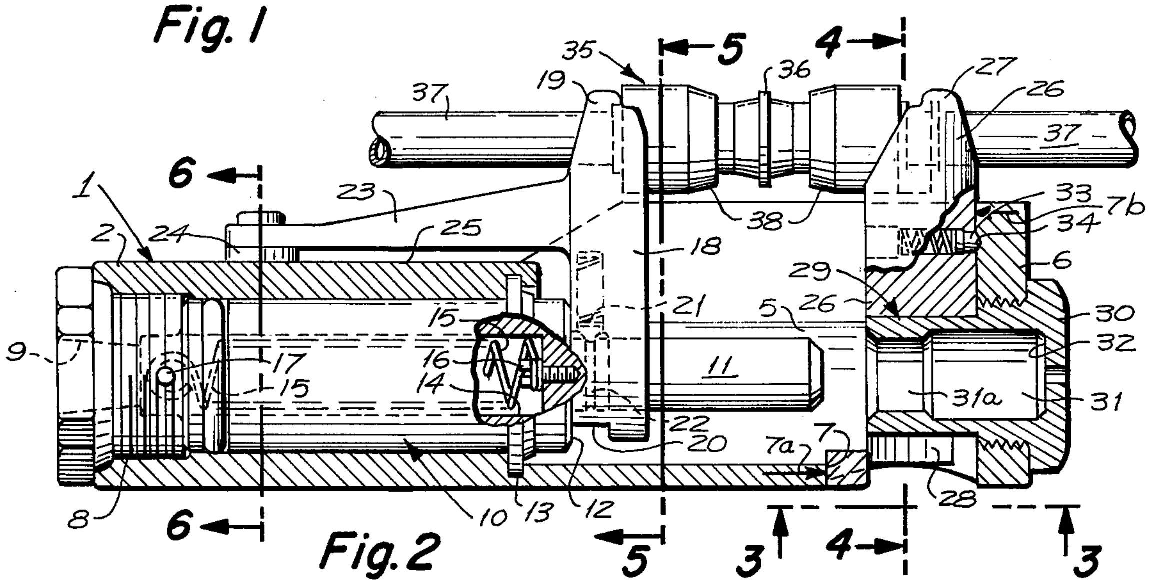
FIG. 2 is a longitudinal sectional view thereof with portion in side elevation.

The piston 10 and cylinder 2 are provided with appropriate seal means 13. The piston 10 is provided with a bore 14 which receives a spring 15 joined to the inner end of the piston 10 by a screw 16 and to the end closure 8 by an anchor pin 17 so that the piston normally occupies a retracted position as shown in FIGS. 1 and 2.

A movable jaw unit is provided which includes a radially disposed bar 18 terminating in a movable jaw 19. The bar 18 includes a cross bore slidably received on the shaft 11. The side of the bar 18, confronting the load bearing surface 12, is radially enlarged to form a semi-cylindrical recess 20 open at its lower end, the margins of which bear against the surface 12. Extending radially from the recess 20 is a socket which receives a detent 21, the extremity of which is received in a groove 22 provided on the shaft 11.

The bar 18 extends radially beyond the cylinder 2 and is provided with an arm 23 extending essentially parallel with the cylinder 2 and having at its extremity a slide bearing 24 confronting the cylinder and engaging a longitudinal bearing surface 25 formed on the cylinder 2.

A jaw unit is provided which includes a bar 26 in excess of a half circle having a fixed jaw 27 at one end. The bar is removably received and guided in the vertical bore 7. The inner end of the bar 26 is provided with a cross slot 28, in axial alignment with the shaft 11, which straddles a guide stem 29. The guide stem 29 is provided with a screw-threaded mounting flange 30 secured in the end wall 6. Formed within the stem 29 is a socket 31 terminating at a stop wall 32 having a small perforation. At its end facing the shaft 11, the socket is reduced slightly in diameter to form a slide bearing **31*a*. An appropriate detent 33 extends transversely with respect to the bar 26 and engages a recess 34 provided in the end wall 6**.

A typical tube fitting adapted for assembly by the assembly tool is identified by the reference character 35. The fitting includes a sleeve 36, the opposite ends of which receive the end portions of tubing 37. The opposite end portions of the sleeve 36 receive lock rings 38. The fitting is more fully disclosed in the aforementioned U.S. Pat. Nos. 3,827,727; 4,026,006 and 4,061,367.

The fixed and movable jaws 19 and 27 may be identical. Each includes a semi-cylindrical slot 39 dimensioned to receive the tubing end portions 37. The confronting ends of the movable and fixed jaws are provided with radially enlarged portions 40 and 41 to receive respectively the ends of the sleeve 36 and the remote ends of the lock rings 38.

Operation of the hydraulic assembly tool is as follows: The preassembled fitting 35 is placed in the jaws 19 and 27 as indicated in FIG. 2. The piston 10 is then actuated to force the movable jaw 19 toward the fixed jaw 27. This movement is coaxial with respect to the semi-cylindrical slots 39 as well as enlarged portions 40 and 41. The enlarged portions retain the fitting in place during axial compression.

A set of fixed and movable jaws of different dimension may be provided on identical bars 18 and 26. To interchange the movable bar 18, it is merely necessary to slide it along the shaft 11 passed the end thereof, it being noted that the clearance between the retracted shaft and the fixed bar 26 is such that the movable bar may be moved clear of the shaft 11 for radial withdrawal. With regard to the fixed bar 26, it is merely necessary to move the bar 26 radially.

Although the jaws may be readily removed and replaced, when in operation, they maintain a coaxial relation even if the force applied is substantial. With respect to the movable jaw, the provision of the slide arm 23 and the support afforded the radial bar 18 by the engagement of shaft 11 with the sleeve bearing 32 enables the movable jaw assembly to withstand substantial radially offset axial loads without objectionable deflections.

With respect to the fixed jaw 27, lateral movement of the lower end of the bar 26 is resisted by the lower end of the bore 7 as indicated by arrow *7a*, which terminated in a full bore. Lateral movement of the upper end of the bar 26 is resisted by the upper end of the bore 7 as indicated by the arrow *7b*. Also the mutual support provided by the sleeve bearing and shaft 11 maintains a coaxial relation between the jaws 19 and 27.

The fixed jaw is also capable of withstanding substantial radially offset axial loads, also without objectionable deflections. Stated otherwise, the fixed and movable jaws are maintained in accurate coaxial relation even under substantial loads; for example, in the order of 8,000 lbs. (4,000 kg) force.

Figure 7:
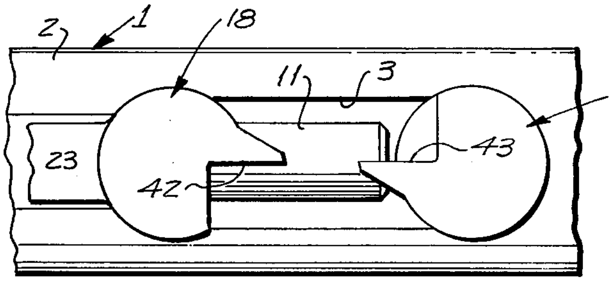
FIG. 7 is a fragmentary top view corresponding to FIG. 1, showing the fitting receiving jaws replaced by a pair of shearing jaws.
Figure 3:
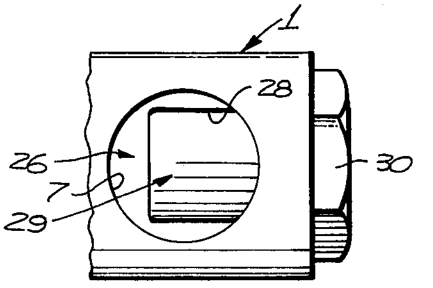
FIG. 3 is a fragmentary bottom view taken from 3—3 of FIG. 2.
Figure 6:
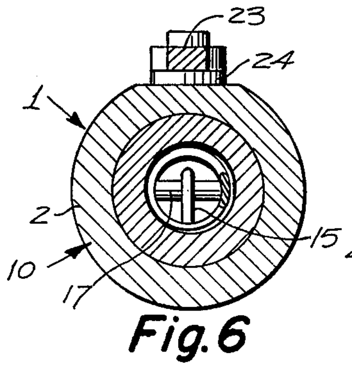
FIG. 6 is a transverse view taken through 6—6 of FIG. 2, the body structure being shown in section, the fixed jaw unit and sleeve being shown in elevation.
Figure 5:
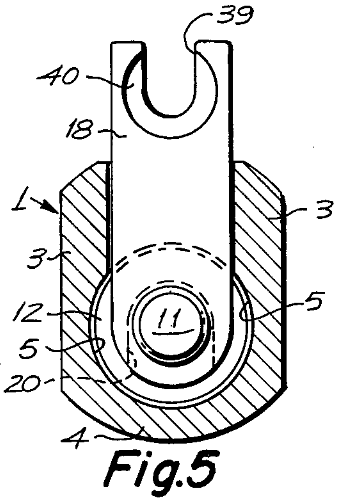
FIG. 5 is a transverse view taken through 5—5 of FIG. 2, the body structure being shown in section, the movable jaw unit and its guide shaft being shown in elevation.
Figure 4:
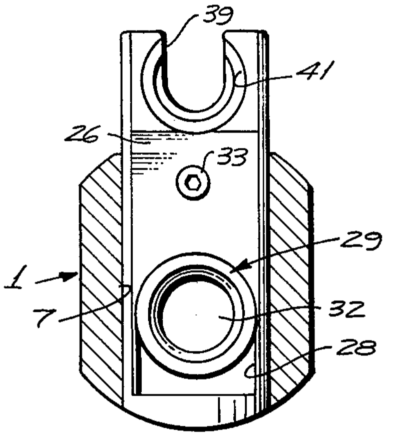
FIG. 4 is a transverse sectional view taken respectively through 4—4 of FIG. 2.

Referring to FIG. 7, while this invention is directed primarily to an assembly tool for tube fittings, it has been discovered that the upper ends of the movable and fixed jaws 19 and 27 may be modified to form shearing jaws 42 and 43. One jaw, such as the fixed jaw, may be transversely flat for engagement by a jaw. Still further, shearing jaws, not shown, may be substituted for the tube fittings 35.

It will be noted that when the tool fittings are in place, access to portions of the assembly tool is difficult, thus minimizing the possibility of injury while operating the tool.

Having fully described my invention, it is to be understood that I am not to be limited to the details herein set forth, but that my invention is of the full scope of the appended claims.

I claim:

1. A hydraulic tool comprising:

a. a body structure, including a hydraulic cylinder, a housing portion extending axially therefrom, and an end wall terminating the housing portion;

b. a piston received in the cylinder;

c. a shaft extending axially from the piston into the housing portion;

d. a first carrier unit extending radially with respect to the shaft; and restrained in the end wall against angular movement;

e. second carrier unit axially movable with the shaft to and from the first carrier unit;

f. second carrier unit angular movement resisting means including an arm extending in parallel offset relation with the shaft from the second carrier unit over the hydraulic cylinder for sliding engagement therewith; and g. cooperating tool elements at the radial extremities of the carrier units defining a common axis parallel to the axis of the shaft.

2. A hydraulic tool, as defined in claim 1, wherein:

a. the second carrier unit is manually movable beyond the shaft for removal from the body structure for substitution of another second carrier unit having a different tool element.

3. A hydraulic tool, as defined in claim 1, wherein:

a. the first carrier unit is radially removable manually for substitution of another first carrier unit having a different tool element.

4. A hydraulic tool, as defined in claim 1, wherein:

a. a guide is disposed in the end wall to slidably receive the shaft and resist angular displacement thereof under radial load, thereby to further resist displacement of the second carrier element from its coaxial relation with the first carrier unit.

5. A hydraulic tool, as defined in claim 1, wherein:

a. the cooperating tool elements are tube fitting assembly elements.

6. A hydraulic tool, as defined in claim 1, wherein:

a. the cooperating tool elements are shearing blades.

7. A hydraulic assembly tool for a tube fitting which is adapted to join confronting ends of a pair of tubes by application of opposing axial force on the tube fitting, the assembly tool comprising:

a. a body structure having first and second closed ends and a channel portion therebetween;

b. a first jaw unit exposed to the channel portion at the first closed end and extending radially from the body structure;

c. a second jaw unit movable in the channel portion between the second closed end and the first jaw unit and extending radially from the body structure;

d. the jaw units having coaxially disposed jaw elements positioned clear of the body structure and engagable with the tube fitting;

e. reciprocal means in the channel for moving the second jaw member; and f. an arm extending from the movable second jaw unit into overlying relation to the cylinder and includes an end portion slidable on the cylinder to restrain the movable jaw element against angular displacement with respect to the common axis of the jaw elements.

8. An assembly tool, as defined in claim 7, wherein:

a. the first end of the body structure is provided with a radially disposed bore having a slot exposing the bore to the channel portion; p1 b. the fixed jaw unit is radially slidable in the bore and restrained against angular movement whereby the corresponding jaw element is restrained against angular displacement.

9. An assembly tool, as defined in claim 7, wherein:

a. a drive unit includes a cylinder and piston extending from the second end wall, and a drive shaft extends from the piston into the channel portion for engagement with the second jaw unit to effect reciprocation thereof with respect to the fixed jaw unit.

* * * * *